United States Patent [19]
Newman

[11] 3,986,344
[45] Oct. 19, 1976

[54] METHOD AND MEANS FOR RECLAIMING HEAT FROM A SEWAGE DISPOSAL SYSTEM

[76] Inventor: Merle E. Newman, 6757 N.W. 4th St., Des Moines, Iowa 50313

[22] Filed: June 16, 1975

[21] Appl. No.: 586,984

[52] U.S. Cl. .............................. 62/238; 62/260; 210/513
[51] Int. Cl.² ................................ B01D 12/00
[58] Field of Search ............ 62/238, 260; 165/45; 210/513

[56] References Cited
UNITED STATES PATENTS

| | | | |
|---|---|---|---|
| 2,484,371 | 10/1949 | Bayston | 62/260 |
| 3,856,672 | 12/1974 | Boswinkle et al. | 165/154 |

*Primary Examiner*—William E. Wayner
*Attorney, Agent, or Firm*—Zarley, McKee, Thomte & Voorhees

[57] ABSTRACT

The means of this invention is in combination with an underground sewage reservoir having a water-holding strata extending therearound adapted to receive water from the reservoir. A perforated conduit extends around the reservoir and through the strata and is adapted to receive water from the strata. A circulating fluid line extends through the conduit so that the circulating fluid will tend to assume the temperature of the water in the conduit. The circulating fluid line is operatively connected to a heat pump means. The method comprises the steps of: (1) providing an underground sewage reservoir in a water-holding strata capable of receiving water from the reservoir; (2) connecting the reservoir to a source of relatively warm fluid sewage; (3) extending a conduit through the water-holding strata and around the reservoir to permit water in the strata to enter the conduit; and (4) extending a circulating fluid carrying line from a heating or cooling system through the conduit so that the circulating fluid will tend to assume the temperature of the water in the conduit.

6 Claims, 5 Drawing Figures

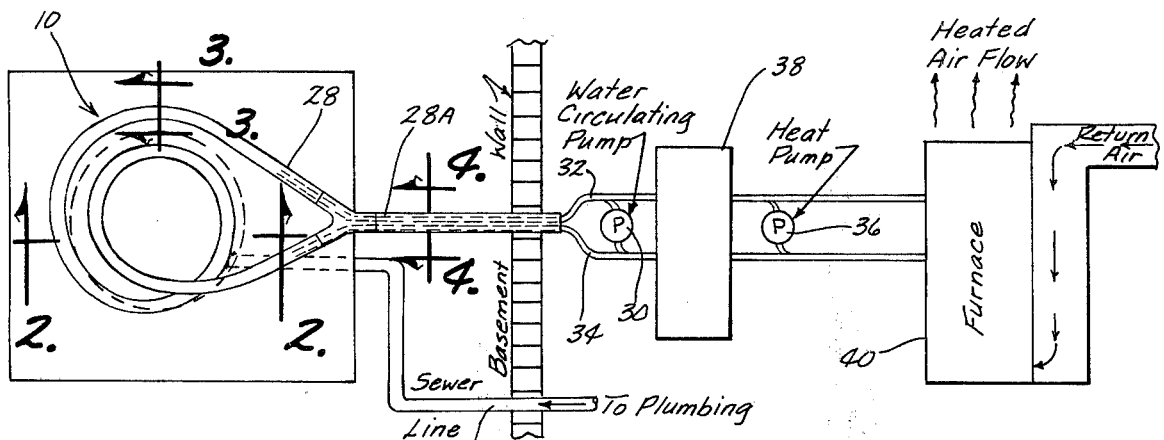
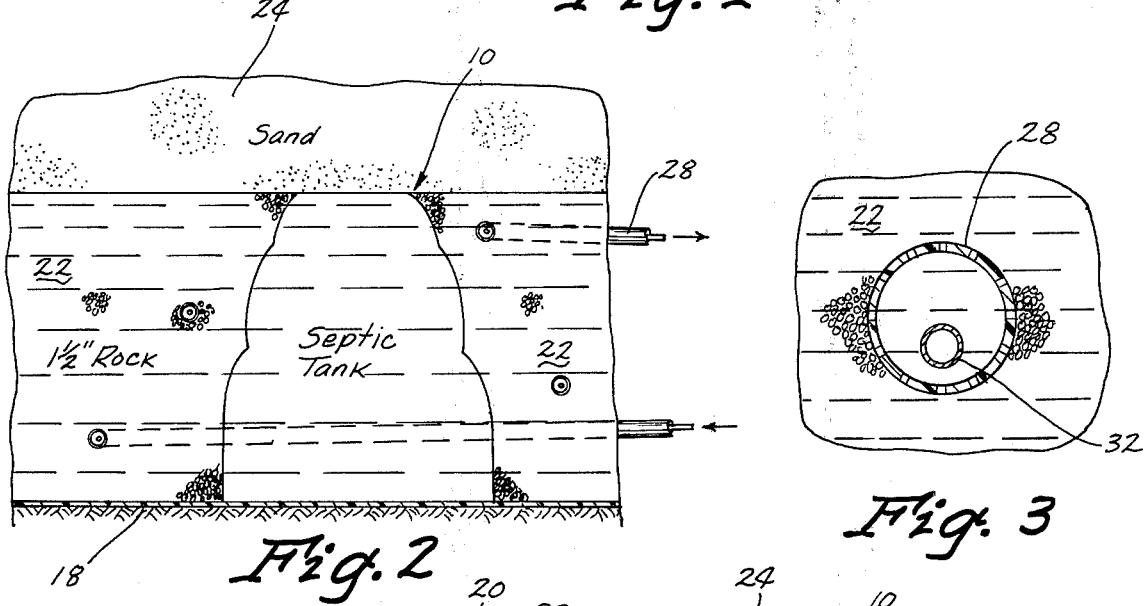

METHOD AND MEANS FOR RECLAIMING HEAT FROM A SEWAGE DISPOSAL SYSTEM

BACKGROUND OF THE INVENTION

The energy shortage prevalent today requires that maximum use be made of all possible sources of energy for heating and cooling purposes.

Many homes and businesses employ a septic tank system for the disposal of waste fluid. The septic tanks commonly discharge the fluid waste into the strata around the tanks in an attempt to purify the waste during the disposal thereof. The waste fluid is relatively warm and is an excellent source of warm fluid which may be used in combination with a heat pump for use in heating the home or business.

Therefore, it is a principal object of the invention is to provide a method and means of reclaiming heat from the sewage disposal system.

A further object of the invention is to provide a method of extracting heat from a sewage disposal system which may be used in conjunction with a heating or cooling system.

A still further object of the invention is to provide a means for reclaiming heat from a sewage disposal system wherein a circulating fluid line extends through a water-holding strata extending around an underground sewage reservoir.

A further object of the invention is to provide a method and means of reclaiming heat from a sewage disposal system which is economical.

A still further object of the invention is to provide a method and means of reclaiming heat from a sewage disposal system which is efficient.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a top schematic view of the means of this invention:

FIG. 2 is an enlarged sectional view seen on lines 2 — 2 of FIG. 1:

FIG. 3 is an enlarged sectional view seen on lines 3 — 3 of FIG. 1:

FIG. 4 is a side view similar to FIG. 2.

FIG. 5 shows an over-all of the underground sewage system.

DESCRIPTION OF THE PREFERRED METHOD AND MEANS

The numeral 10 refers generally to an underground sewage reservoir such as a septic tank or the like connected to the sewer line 12 extending from the plumbing of a home or business as illustrated in FIG. 1. Sewer line 12 is connected to the tank 10 in conventional fashion and the tank 10 discharges the fluid sewage into the strata 14 extending around the tank 10. Preferably, the strata 14 is formed so as to be water-holding. The strata is made to be water-holding by forming an excavation 16 in the earth 18. A durethene polyethelene film 20 is laid on the excavation before the rock 22 and sand 24 are placed in position around the tank 10. Preferably, sub-soil 26 extends around the excavation as illustrated in FIG. 5.

The numeral 28 refers to a flexible perforated pipe or conduit which extends through the water-holding strata and around the tank 10 as illustrated. The conduit 28 is perforated to permit the water in the strata to enter the conduit.

The numeral 30 refers to a water circulating pump having a discharge line 32 extending therefrom which extends through the conduit 28 and which returns to the pump 30 as a return line 34. For purposes of description, lines 32 and 34 may be simply referred to as a circulating fluid carrying line. The numeral 28A refers to a portion of the conduit 28 which is not perforated.

A conventional heat pump 36 is operatively connected to the circulating pump 30 in conventional fashion through the conventional water jacket 38. The heat pump 36 is of the water cooled variety and is operatively connected to the furnace 40 located in the home or business. The elements 30, 36, 38 and 40 are of conventional design and are readily available on the market.

In operation, the relatively warm fluid sewage would be discharged into the septic tank 10 through the sewer line 12. The septic tank 10 discharges the relatively warm water into the strata surrounding the tank and the water from the tank in the strata enters the conduit 28. The water circulating pump 30 is operated so that the circulating fluid in the lines 32 and 34 tends to assume the temperature of the water in the conduit as it passes therethrough. Thus, the heated circulated fluid is furnished to the heat pump 36 through the water jacket 38 to permit the heat pump to either heat or cool the residence or business.

Thus it can be seen that a method and means has been provided for reclaiming heat from a sewage disposal system which results in a very efficient operation. In climates where the reclaim is not sufficient such as in periods of extremely cold weather, a heat coil may be installed in the furnace plenum as an auxiliary unit.

Thus it can be seen that the method and means accomplishes at least all of its stated objectives.

I claim:

1. The method of extracting heat from a sewage disposal system for use in conjunction with a heating or cooling system comprising, providing an underground sewage reservoir in a water-holding strata capable of receiving water from said reservoir, connecting said reservoir to a source of relatively warm fluid sewage, extending a conduit through said water-holding strata and around said reservoir, and permitting water in said strata to enter said conduit, and extending a circulating fluid carrying line from a heating or cooling system through said conduit so that said circulating fluid will tend to assume the temperature of the water in said conduit.

2. The method of claim 1 wherein the heating or cooling system comprises a heat pump means.

3. The combination of a heat pump and a means for reclaiming heat from a sewage disposal system, comprising, a heat pump means including a circulating fluid line, an underground sewage reservoir, a water-holding strata extending around said reservoir and being adapted to receive water from said reservoir, a conduit extending through said strata and around said reservoir and being adapted to receive water from said strata, said circulating fluid line extending through said conduit so that said circulating fluid will tend to assume the temperature of the water in said conduit.

4. The combination of claim 3 wherein said underground sewage reservoir comprises a septic tank.

5. The combination of claim 3 wherein a moisture barrier film extends at least partially around said water-holding strata.

6. The combination of claim 3 wherein a fluid circulating pump is operatively connected to said fluid circulating line.

* * * * *